US006955188B2

(12) United States Patent
Heckt

(10) Patent No.: US 6,955,188 B2
(45) Date of Patent: Oct. 18, 2005

(54) SWITCH VALVE FOR THE EXHAUST GASES OF AN INTERNAL COMBUSTION ENGINE

(75) Inventor: Roman Heckt, Aachen (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 145 days.

(21) Appl. No.: 10/410,972

(22) Filed: Apr. 10, 2003

(65) Prior Publication Data

US 2003/0192606 A1 Oct. 16, 2003

(30) Foreign Application Priority Data

Apr. 15, 2002 (DE) ................. 102 16 537

(51) Int. Cl.[7] ........................... F16K 11/074
(52) U.S. Cl. ...................... 137/875; 137/87
(58) Field of Search ............ 137/875, 87, 625.44

(56) References Cited

U.S. PATENT DOCUMENTS

| | | | | |
|---|---|---|---|---|
| 2,040,930 A | * | 5/1936 | Frisch | 137/625.44 |
| 2,244,986 A | * | 6/1941 | Drane | 137/122 |
| 2,679,230 A | | 5/1954 | Ward | |
| 3,664,706 A | * | 5/1972 | Chant | 298/1 H |
| 4,718,457 A | | 1/1988 | Luger | |
| 4,919,169 A | * | 4/1990 | Bachmann et al. | 137/875 |
| 5,105,853 A | | 4/1992 | Lie | |
| 5,410,876 A | | 5/1995 | Simko | |
| 5,908,047 A | * | 6/1999 | Nakamura et al. | 137/875 |

FOREIGN PATENT DOCUMENTS

| | | |
|---|---|---|
| DE | 195 26 765 | 1/1997 |
| FR | 2 515 274 | 4/1983 |
| GB | 2 325 399 | 11/1998 |

* cited by examiner

Primary Examiner—John Fox
(74) Attorney, Agent, or Firm—Brinks Hofer Gilson & Lione

(57) ABSTRACT

The invention relates to a switch valve for the exhaust gases of an internal combustion engine. The switch valve includes a housing part in which an inlet and a first outlet and a second outlet are formed. A directional control member in the form of a swinging flap is located within the housing part and either the first outlet or the second outlet may selectively be closed, as a result of which the respective other outlet is in connection with the inlet. In order to minimize the production effort while achieving a simple structural design and high efficiency, it is proposed that an encircling rim, for establishing sealing contact with the flap, is formed in the interior of the housing part in the transitional region between the inlet and each of the outlets, each rim defining a stop plane for the flap.

21 Claims, 3 Drawing Sheets

SWITCH VALVE FOR THE EXHAUST GASES OF AN INTERNAL COMBUSTION ENGINE

BACKGROUND OF THE INVENTION

The present invention relates to a directional control apparatus for flowing media, especially a switch valve for the exhaust gases of an internal combustion engine, having a housing part in which an inlet and a first outlet and a second outlet are formed, and having a directional control member in the form of a swinging flap by which either the first outlet or the second outlet may selectively be closed, as a result of which the respective other outlet is in connection with the inlet.

In order, for example, for it to be possible to use the exhaust-gas heat of internal combustion engines to heat up a cooler medium, or in order to reduce the emission levels of the emerging gases, it is necessary for the gases, at least intermittently, to flow through a heat exchanger, a $NO_x$ converter acting by catalysis, a $NO_x$ storage catalyst, a particle filter, an absorber or other special components. A method of this type and an appropriate apparatus are described, for example, in DE 195 26 765. In accordance with this known technical solution, flap valves are provided both in a main line and in a bypass line and are opened and closed alternately, but separately in each case.

As separate valves in different lines require a high design input, directional control apparatuses have been described for similar purposes that are also described as switch valves, with which it is possible simultaneously with the opening of one line of the flowing medium to shut off another line. Such an apparatus of this type is known, for example, from U.S. Pat. No. 5,410,876, which describes a catalytic converter assembly with a bypass. According to one of the embodiments shown therein, a swinging flap is provided, by means of which a first or a second outlet can selectively be shut off. When this occurs, the flap projects into the region of the inlet and, in each of its two possible end positions, lies against one of the side walls of the inlet. The assembly is very compact and requires a high level of accuracy in production—not only for the flap but also for the contact surfaces on the inlet wall.

BRIEF SUMMARY OF THE INVENTION

It is an object of the present invention to provide a directional control apparatus for flowing media, especially a switch valve for the exhaust gases of an internal combustion engine, of the type described initially, which is notable for a high degree of efficiency with a simple structural design and minimized production effort.

This is achieved, according to the invention, by a directional control apparatus of the type specified initially in which an encircling rim for the sealing contact of the flap is formed in the interior of the housing part in the transitional region between the inlet and each of the outlets, each rim defining a stop plane for the flap.

The main advantage of this directional control apparatus according to the invention resides in the fact that the housing can be unmachined on its inside without any reduction in the sealing effect of the flap occurring during operation. It is thus possible to reduce the production effort significantly, and the one-part or multipart housing can preferably be produced by casting.

The stop planes of the flap of the apparatus according to the invention stand at an angle to one another of from 30° to 180°, preferably from 60° to 120°. This takes due account, inter alia, of the requirement that, because of the wide range of different flow rates in the exhaust gas system of the internal combustion engine of a vehicle, appropriate allowance be made during the designing of all the essential components for dynamic behavior of the flow of fluid in its interaction with various structural details.

Thus it is also possible, in particular, in order to reduce the pressure drop occurring in the apparatus according to the invention, for the housing part to form the shape of a Y with its inlet and its two outlets, the tube sections of the outlets being disposed approximately parallel to one another.

The flap can advantageously be mounted for rotation on a shaft which provides the swinging motion, the shaft being mounted at one end in the housing part, especially in an interior wall recess of the housing part, and is guided out of the housing part at the other end. In this case it is of particular advantage in the interests of high efficiency if the shaft is mounted in its bearing points so as to be movable at right angles to the direction of its longitudinal axis in such a way that when the flap contacts each of the encircling rims under the action of the flowing medium automatic sealing adaptation to the rim takes place.

Further advantageous features of embodiments of the invention are contained in the dependent claims and in the description which follows.

BRIEF DESCRIPTION OF THE DRAWINGS

The invention will now be explained in more detail with reference to two preferred examples of embodiment shown in the drawings, in which.

In the various figures of the drawings, identical and mutually corresponding parts are always provided with the same reference symbols and are therefore also only described once in each case.

DETAILED DESCRIPTION OF THE INVENTION

Figure 1:
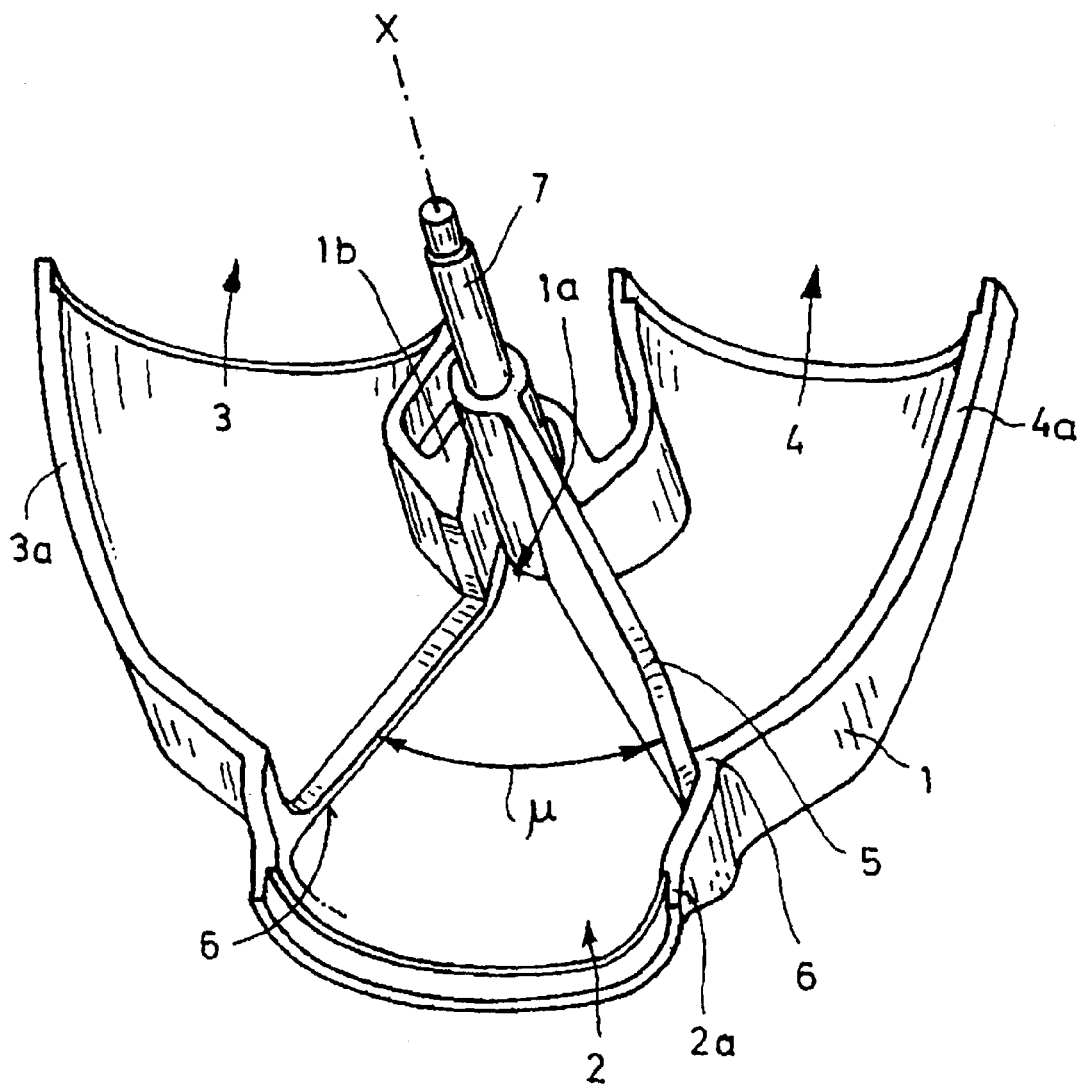
FIG. 1 shows a perspective longitudinal section through a first embodiment of a switch valve according to the principles of the invention.
Figure 2:
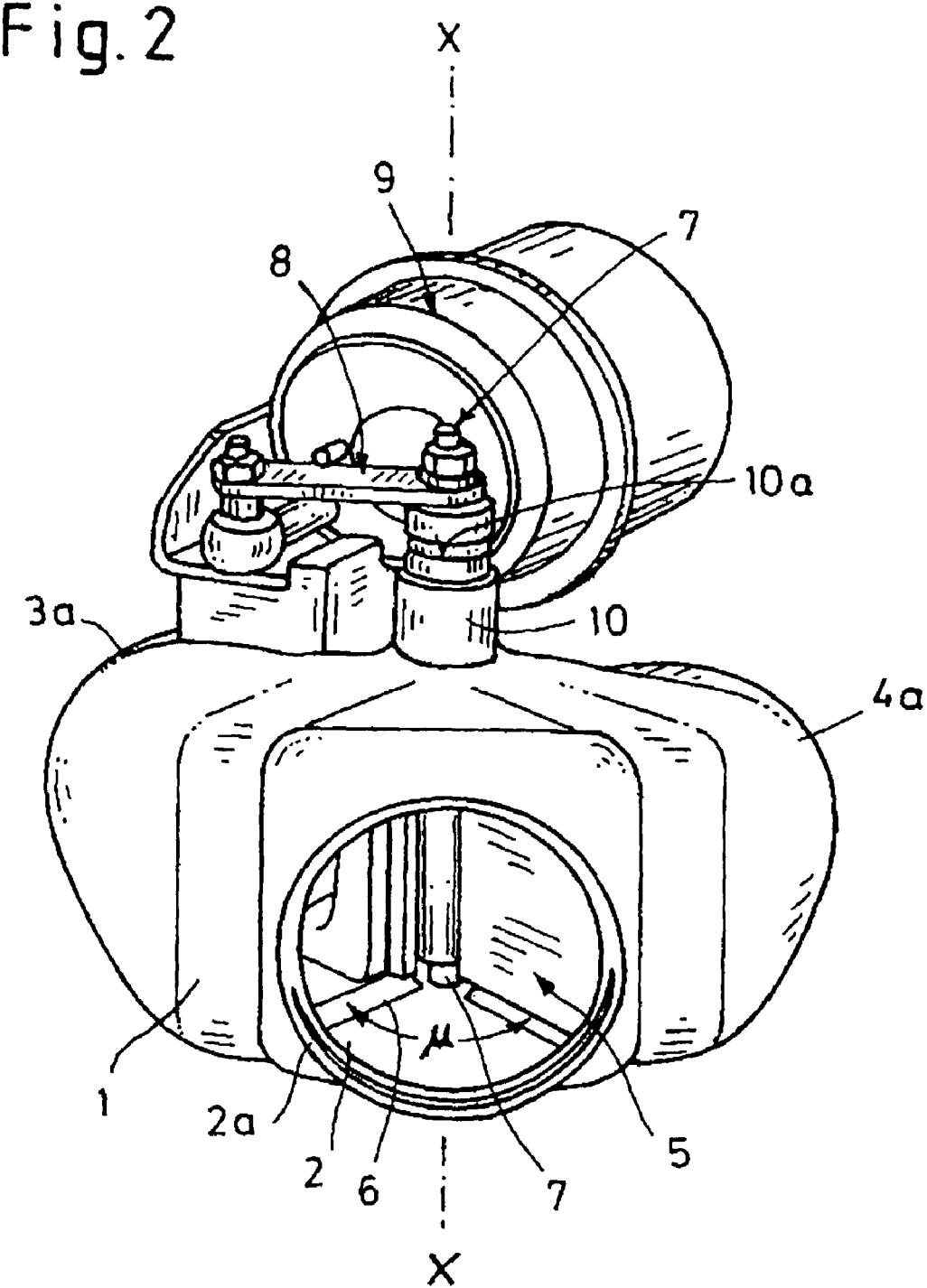
FIG. 2 shows a perspective view of the first embodiment of a switch valve according to the principles of the invention in its entirety.

As is apparent, first, from FIGS. 1 and 2, a directional control apparatus according to the invention for flowing media, especially a switch valve for the exhaust gases of an internal combustion engine, comprises a housing part 1 in which an inlet 2 and a first outlet 3 and a second outlet 4 are formed. Furthermore, the switch valve comprises a directional control member in the form of a swinging flap 5 by means of which either the first outlet 3 or the second outlet 4 may selectively be shut off, as a result of which the respective other outlet 4, 3 is in connection with the inlet 5.

The inlet 2 and the outlets 3, 4 are formed as tube sections 2a, 3a, 4a. An encircling, projecting, web-like rim 6, for the sealing contact of the flap 5, is formed in the interior of the housing part 1 in the transitional region between the inlet and each of the outlets. Each of these rims 6 defines a stop plane for flap 5. These stop planes of the flap 5 may stand at an angle p to one another of from 30° to 180°, preferably from 60° to 120°. The angle μ shown in FIG. 1 is approximately 75°.

The flap 5 is fixed in a manner fixed in rotation on a shaft 7 which provides the swinging motion. The shaft 7 is mounted at one end in the housing part 1, especially in an interior wall recess 1a of the housing part 1 (FIGS. 1, 3), and is guided out of the housing part 1 at the other end (FIG. 2).

Figure 3:
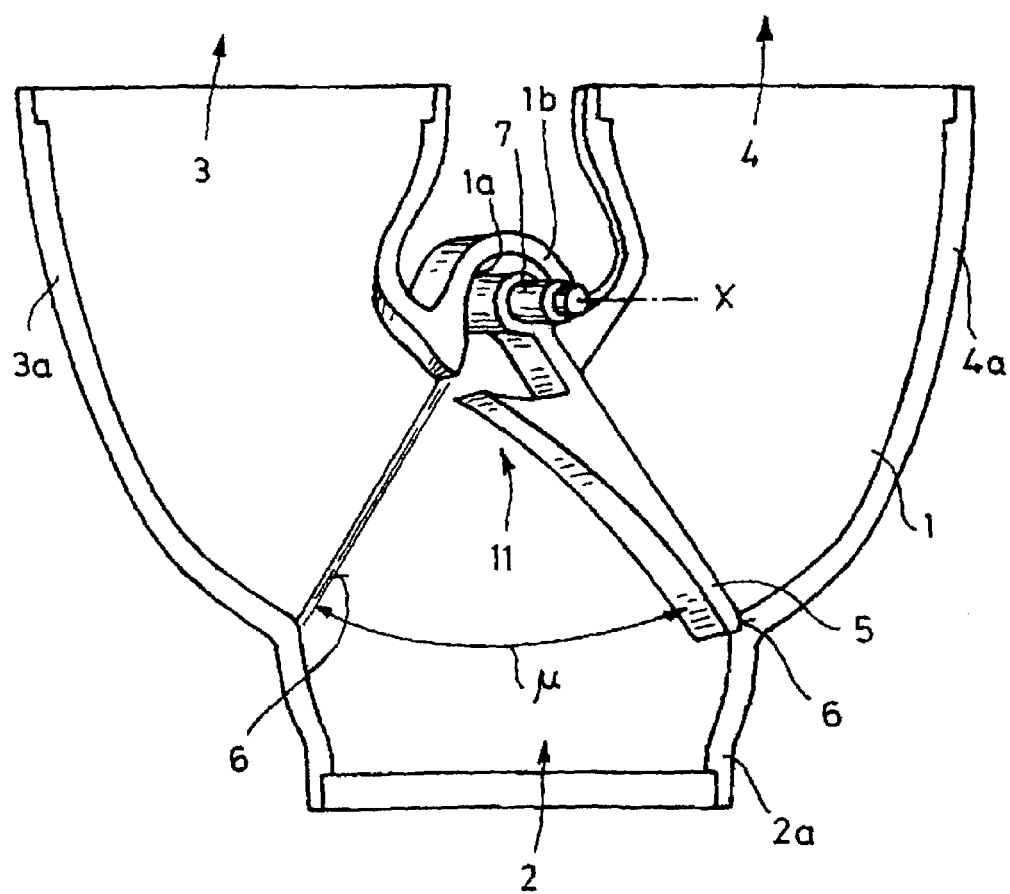
FIG. 3 shows a view corresponding to FIG. 1 of a second embodiment of a switch valve according to the principles of the invention.

The shaft 7 is preferably mounted in the housing part 1 in a region which is defined, for example, by an initial region of the reciprocal passage of the tube sections of the outlets or, as illustrated in FIGS. 1 and 3, is adjacent to this initial region as an additional housing section 1b. In this case, the housing section 1b partially surrounds the interior wall recess 1a of the housing part 1 serving as the shaft bearing.

As both FIG. 1 and FIG. 3 illustrate, the housing part 1 of the two preferred embodiments shown of the directional control apparatus according to the invention forms, with its inlet 2 and its two outlets 3, 4 (tube sections 3a, 4a) the shape of Y, the tube section 3a, 4a of the outlets 3, 4 being disposed approximately parallel to one another. As a result of this configuration, which is advantageous for flow dynamics, the fluid undergoes only a very slight pressure drop as it flows through the switch valve according to the invention.

The cross sections of the inlet 2 and of the outlets 3, 4 are in each case round, while the cross section of the housing part 1, in the region of each of the encircling rims 6, is approximately rectangular and approximately equal in area with the cross sections of the outlets 3, 4 and with that of the inlet 2. The necessary torque to switch over the valve is here determined primarily by the static pressure of the flowing fluid and the distance between the surface centers of gravity of the cross sections in the region of the encircling rims 6. A reduction of the static pressure with simultaneous minimal pressure loss is not possible; a favorable distance between the centers of gravity of the cross sections in the region of the encircling rims 6 is therefore achieved by the approximately rectangular cross-sectional shape with a tendency for the edge length to be greater parallel to the longitudinal axis X.

The housing part 1 may preferably be a one-part or multipart iron casting, and can advantageously be left unmachined on the inside. Because of the geometric conditions within the Y-shaped housing part 1 it would be very difficult and costly to machine the stops for the flap 5 (rims 6).

Only the flap 5, the shaft 7 and the contact surface (wall recess 1a) for the shaft 7 are machined. If, as shown, a housing section 1b is provided which partially surrounds the interior wall recess 1a of the housing part 1 serving as the shaft bearing, the latter may also be of virtually flat configuration.

The advantages of the directional control apparatus according to the invention are thus, in particular, its low production costs and its optimum design with a view to the flow of exhaust gas.

The end of the shaft 7 guided out of the housing part 1 is connected via an articulated lever 8 to an actuating device 9 for the flap 5. Obviously, other actuator mechanisms and schemes could be employed. The housing part 1 comprises a collar or dome-shaped appendage 10 on the side on which the shaft 7 is guided out.

The shaft 7 is mounted in its bearing points (wall recess 1a, housing section 1b, appendage 10) so as to be movable transversely to the direction of its longitudinal axis X, especially displaceable in a direction extending at right angles to the longitudinal axis X, in such a way that when the flap 5 contacts each of the encircling rims 6 under the action of the flowing medium, automatic sealing adaptation to the respective rim 6 takes place. Any dimensional inaccuracies can thus be compensated, or a broad range of admissible tolerances can be predetermined from the outset, which reduces the reject rate during production.

For this purpose, the wall recess 1a of the housing part 1 or of the housing section 1b, in which the shaft 7 is mounted at one end, has a diameter that is greater than the external diameter of the shaft 7. Similarly, the dome-shaped appendage 10 of the housing part 1 surrounding the shaft has an internal diameter that is greater than the external diameter of the shaft 7. As a result of the possible bearing play of the shaft 7, which is determined by the differences in diameter, the shaft 7 may also move transversely to its longitudinal axis X during swinging and the flap 5 can enter into optimum contact with the respective stops.

On the side on which the shaft 7 is mounted in the housing part 1, it is not necessary to provide any seals, whereas the housing part 1 may advantageously comprise a sealing surface 10a on the side on which the shaft 7 is guided out, especially on the dome-shaped appendage surrounding the shaft 7, the normal vector of the sealing surface 10a extending in the direction of the longitudinal axis X of the shaft 7. Thus the shaft can be rotated radially without any impairment of the sealing function occurring.

The second embodiment of a switch valve according to the principles of the invention, shown in FIG. 3, differs from the first embodiment in that a flow guidance element 11 is formed on the flap 5 on at least one side. This flow guidance element 11, which may also be described as a spoiler, serves to improve the flow behavior of the flowing medium. As the drawing shows, it not only possess an aerodynamically optimized shape but is also so dimensional that neither during the swinging of the flap 5 nor in its end positions at the rims 6 does it collide in any way with the rims or with the housing part 1 (especially the housing section 1a that surrounds the shaft 7) but indeed, in every position of the flap, fits with non-positive fitting but with pay into the housing part 1. If only one flow guidance element is present, this is disposed on the principal flow side of the flap 5. In addition to an improvement in the flow behavior, this has the effect of avoiding the accumulation of particles, such as soot, entrained with the flowing medium from accumulating in the region of the wall recess 1a.

The invention is not restricted to the examples of embodiment shown but also comprises all embodiments of equivalent effect within the meaning of the invention. Thus, for example, other housing configurations (for example, T-shaped instead of Y-shaped) or other actuating devices (for example, with Bowden cables) are possible without thereby departing from the scope of the invention.

Moreover, the invention is not confined to the combination of features defined in claim 1 but may also be defined by any other combination of features of all the set of individual features disclosed. This means that, in principle, each individual feature of claim 1 may be omitted or be replaced by at least one feature disclosed elsewhere in the application. To that extent, claim 1 may be understood as merely a first attempt to formulate an invention.

What is claimed is:

1. A switch valve for the exhaust gases of an internal combustion engine, comprising:
   a housing part in which an inlet and a first outlet and a second outlet are formed,
   a directional control member located within the housing part in the form of a swinging flap by which either the first outlet or the second outlet may selectively be closed, as a result of which the respective other of the first outlet or the second outlet is in connection with the inlet, a projecting rim adapted to sealingly contact the flap, wherein the rim is formed in the interior of the housing part in a transitional region between the inlet and each of the first and second outlets, and each rim defining a stop plane for the flap;

the flap being mounted to a shaft and the shaft being mounted in bearings so as to be movable transversely to the direction of its longitudinal axis in such a way that when the flap contacts each of the rims under the action of the f owing medium, automatic sealing adaptation to the rim takes place.

2. A switch valve according to claim 1, wherein the inlet and the first and second outlets are formed as tube sections.

3. A switch valve according to claim 1, wherein the stop planes of the flap stand at an angle to one another from about 30° to 180°.

4. A switch valve according to claim 1, wherein the stop planes of the flap stand at an angle to one another from about 60° to 120°.

5. A switch valve according to claim 1, wherein the housing part is a one-part casting.

6. A switch valve according to claim 1, wherein the housing part is a multipart casting.

7. A switch valve according to claim 1, wherein the housing part forms the shape of a Y with the inlet and the first and second outlets.

8. A switch valve according to claim 1, wherein the tube sections of the first and second outlets are approximately parallel to one another and axially parallel to the tube section of the inlet.

9. A switch valve according to claim 1, wherein end faces of the inlet and of the first and second outlets are generally round in the cross sections.

10. A switch valve according claim 1, wherein a flow guidance element is formed on the flap on at least one side.

11. A switch valve according to claim 1, wherein the flap is rotationally mounted with respect to the housing part in a manner which provides a swinging motion.

12. A switch valve according to claim 1, wherein the shaft is mounted at one end in the housing part and extends out of the housing part at the other end.

13. A switch valve according to claim 12, wherein the housing part in which the shaft is mounted at one end has a diameter that is greater than the external diameter of the shaft.

14. A switch valve according to claim 12, wherein the housing part comprises a sealing surface on the side on which the shaft is guided out a normal vector of the sealing surface extending in the direction of a longitudinal axis of the shaft.

15. A switch valve according to claim 1, wherein the shaft is connected to an actuating device for the flap.

16. A switch valve according to claim 15, wherein the shaft is connected via an articulating lever to the actuating device.

17. A switch valve according to claim 15, wherein the housing part comprises a dome-shaped appendage on the side on which the shaft extends there out of.

18. A switch valve according to claim 1, wherein the shaft is mounted in the housing part in a region which is defined by an initial region of a reciprocal passage of the first and second outlets.

19. A switch valve according to claim 1, wherein in the region of each of the rims, a cross section of the housing part is approximately rectangular.

20. A switch valve according to claim 19, wherein the cross section area of each rim is approximately equal in area with the cross section area of each of the inlet and the outlets.

21. A switch valve according to claim 20, wherein the dome-shaped appendage of the housing part has an internal diameter that is greater than an external diameter of the shaft.

* * * * *

UNITED STATES PATENT AND TRADEMARK OFFICE
CERTIFICATE OF CORRECTION

PATENT NO. : 6,955,188 B2 Page 1 of 1
DATED : October 18, 2005
INVENTOR(S) : Roman Heckt It is certified that error appears in the above-identified patent and that said Letters Patent is hereby corrected as shown below:

Column 5,
Line 14, after "action of the" delete "f owing" and substitute -- flowing --.

Signed and Sealed this

Twenty-fifth Day of April, 2006

JON W. DUDAS
*Director of the United States Patent and Trademark Office*